US008218530B2

(12) United States Patent
Payyappilly et al.

(10) Patent No.: US 8,218,530 B2
(45) Date of Patent: Jul. 10, 2012

(54) SEAMLESS HANDOFF BETWEEN ACCESS NETWORKS WITH SAVED SESSION INFORMATION

(75) Inventors: Ajith T. Payyappilly, San Diego, CA (US); Rajeev S. Kurundkar, San Diego, CA (US); Sriram Nagesh Nookala, San Diego, CA (US); Vipin A. Sali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1734 days.

(21) Appl. No.: 11/478,417

(22) Filed: Jun. 28, 2006

(65) Prior Publication Data

US 2007/0155376 A1 Jul. 5, 2007

Related U.S. Application Data

(60) Provisional application No. 60/756,962, filed on Jan. 5, 2006.

(51) Int. Cl.
*H04L 12/66* (2006.01)
*H04W 36/00* (2009.01)

(52) U.S. Cl. ........................................ 370/352; 455/436
(58) Field of Classification Search .................. 370/352; 455/436–444
See application file for complete search history.

(56) References Cited

U.S. PATENT DOCUMENTS

| 2002/0021681 | A1* | 2/2002 | Madour | 370/331 |
|---|---|---|---|---|
| 2003/0039259 | A1* | 2/2003 | Madour | 370/401 |
| 2003/0112766 | A1* | 6/2003 | Riedel et al. | 370/252 |
| 2003/0169704 | A1* | 9/2003 | Okanoue | 370/328 |
| 2004/0198365 | A1 | 10/2004 | Verma et al. | |
| 2006/0123122 | A1* | 6/2006 | Jung et al. | 709/227 |
| 2006/0153124 | A1* | 7/2006 | Kant et al. | 370/328 |
| 2008/0008127 | A1 | 1/2008 | Choi et al. | |

FOREIGN PATENT DOCUMENTS

CN 1496171 A 5/2004

(Continued)

OTHER PUBLICATIONS

3rd Generation Partnership Project 2, 3GPP2 C.S0063-0, v1.0, Mar. 2005, www.3gpp2.org/public_html/specs/C.S0063-0_v1.0_050322.pdf.*

(Continued)

*Primary Examiner* — Asad Nawaz
*Assistant Examiner* — Nicholas Jensen
(74) *Attorney, Agent, or Firm* — Kevin T. Cheatham

(57) ABSTRACT

More seamless handoff between access networks is achieved by saving session information for each access network upon being handed off from the access network and invoking the saved session information upon being handed back to the access network. An access terminal establishes a first session with a first access network, which may entail performing QoS negotiation with the first access network and setting up packet filters at a packet data gateway. The access terminal exchanges data with the first access network in accordance with the configuration of the first session. The access terminal saves the first session configuration after being handed off to a second access network, establishes a second session with the second access network, and exchanges data with the second access network in accordance with the configuration of the second session. The access terminal uses the saved first session configuration upon being handed back to the first access network.

24 Claims, 8 Drawing Sheets

FOREIGN PATENT DOCUMENTS

| | | | |
|---|---|---|---|
| EP | 1018849 | A2 | 7/2000 |
| EP | 1411740 | A1 * | 4/2004 |
| JP | 2004254278 | A | 9/2004 |
| WO | WO2005086377 | A1 | 9/2005 |

OTHER PUBLICATIONS

3rd Generation Partnership Project 2, cdma200 Wireless IP network Standard: Quality of Service and Header Reduction, 3GPP2 X.S0011-004-C, v1.0, Aug. 2003 www.3gpp2.org/Public_html/specs/X.S0011-004-C_v1.0_022004.pdf.*

International Search Report and Written Opinion—PCT/US2007/060187, International Search Authority—European Patent Office—Feb. 16, 2009.

Translation of Office Action in Japan application 2008-549664 corresponding to U.S. Appl. No. 11/478,417, citing JP2004254278 and WO2005086377 dated Mar. 8, 2011.

* cited by examiner

SEAMLESS HANDOFF BETWEEN ACCESS NETWORKS WITH SAVED SESSION INFORMATION

The present Application for Patent claims priority to Provisional Application No. 60/756,962 entitled "METHOD TO MAKE HANDOFFS BETWEEN MPA AND EMPA EVDO NETWORKS SEAMLESS" filed Jan. 5, 2006, and assigned to the assignee hereof and hereby expressly incorporated by reference herein.

BACKGROUND

I. Field

The present disclosure relates generally to communication, and more specifically to techniques for performing handoff between wireless communication networks.

II. Background

Wireless communication networks are widely deployed to provide various communication services such as voice, video, packet data, and so on. These wireless networks may be multiple-access networks (or simply, access networks) capable of supporting multiple users by sharing the available resources. Examples of such access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

A user may utilize an access terminal (e.g., a cellular phone) to obtain various communication services. Each service may be satisfactorily provided to the user by ensuring that a specified quality of service (QoS) is achieved for that service. QoS may be quantified by different parameters for different services. For example, a voice service may require a relatively stringent delay and a certain minimum guaranteed data rate whereas a packet data service may require a certain target packet error rate.

An access terminal may perform negotiation with a first access network to obtain the desired QoS for a service. The access terminal may thereafter move into the coverage of a second access network and may be handed off from the first access network to the second access network. The access terminal may need to perform negotiation with the second access network to obtain the desired QoS for the service. In general, the access terminal may perform QoS negotiation for each access network to which the access terminal is handed off. The QoS negotiation with each access network typically requires exchanges of signaling messages between the access terminal and the access network, which consumes valuable radio resources. The QoS negotiation also disrupts service, which may be undesirable for the user.

There is therefore a need in the art for techniques to more efficiently perform handoff between access networks.

SUMMARY

Techniques for performing handoff between access networks more seamlessly are described herein. The techniques achieve seamless handoff by (1) saving session information for each access network upon being handed off from the access network and (2) invoking the saved session information upon being handed back to the access network.

In an embodiment, an access terminal establishes a first session with a first access network, which may be an access network supporting Multi-flow Packet Application (MPA) in CDMA2000 1xEV-DO, an access network supporting Enhanced Multi-flow Packet Application (EMPA) in CDMA2000 1xEV-DO, or some other access network. The session establishment may entail performing QoS negotiation with the first access network and setting up packet filters at a packet data gateway for the first access network. The configuration of the first session may comprise the QoS negotiated with the first access network, flow information, information used to create the packet filters, and so on. The access terminal then exchanges data with the first access network in accordance with the configuration of the first session.

The access terminal saves the first session configuration after being handed off from the first access network to a second access network. The access terminal establishes a second session with the second access network and exchanges data with the second access network in accordance with the configuration of the second session. The access terminal uses the saved first session configuration upon being handed back to the first access network. This allows the access terminal to avoid performing QoS negotiation again with the first access network and setting up new packet filters at the packet data gateway. The access terminal then exchanges data with the first access network in accordance with the first session configuration.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various wireless wide area networks (WWANs) such as CDMA, TDMA, FDMA, and OFDMA networks. A CDMA network may implement one or more radio technologies such as CDMA2000, Wideband-CDMA (W-CDMA), and so on. CDMA2000 covers IS-2000, IS-856, and IS-95 standards. The CDMA2000 family of standards is described in documents from an organization named "3rd Generation Partnership Project 2" (3GPP2). IS-2000 Releases 0 and A are commonly referred to as CDMA2000 1X (or simply, 1X), IS-2000 Release C is commonly referred to as CDMA2000 1xEV-DV (or simply, 1xEV-DV), and IS-856 is commonly referred to as CDMA2000 1xEV-DO (or simply, 1xEV-DO). A TDMA system may implement a radio technology such as Global System for Mobile Communications (GSM). W-CDMA and GSM are described in documents from an organization named "3rd Generation Partnership Project" (3GPP). The techniques described herein may also be used for wireless local area networks (WLANs) such as IEEE 802.11 networks. These various radio technologies and standards are known in the art. For clarity, the techniques are specifically described below for 1xEV-DO access networks.

Figure 1:
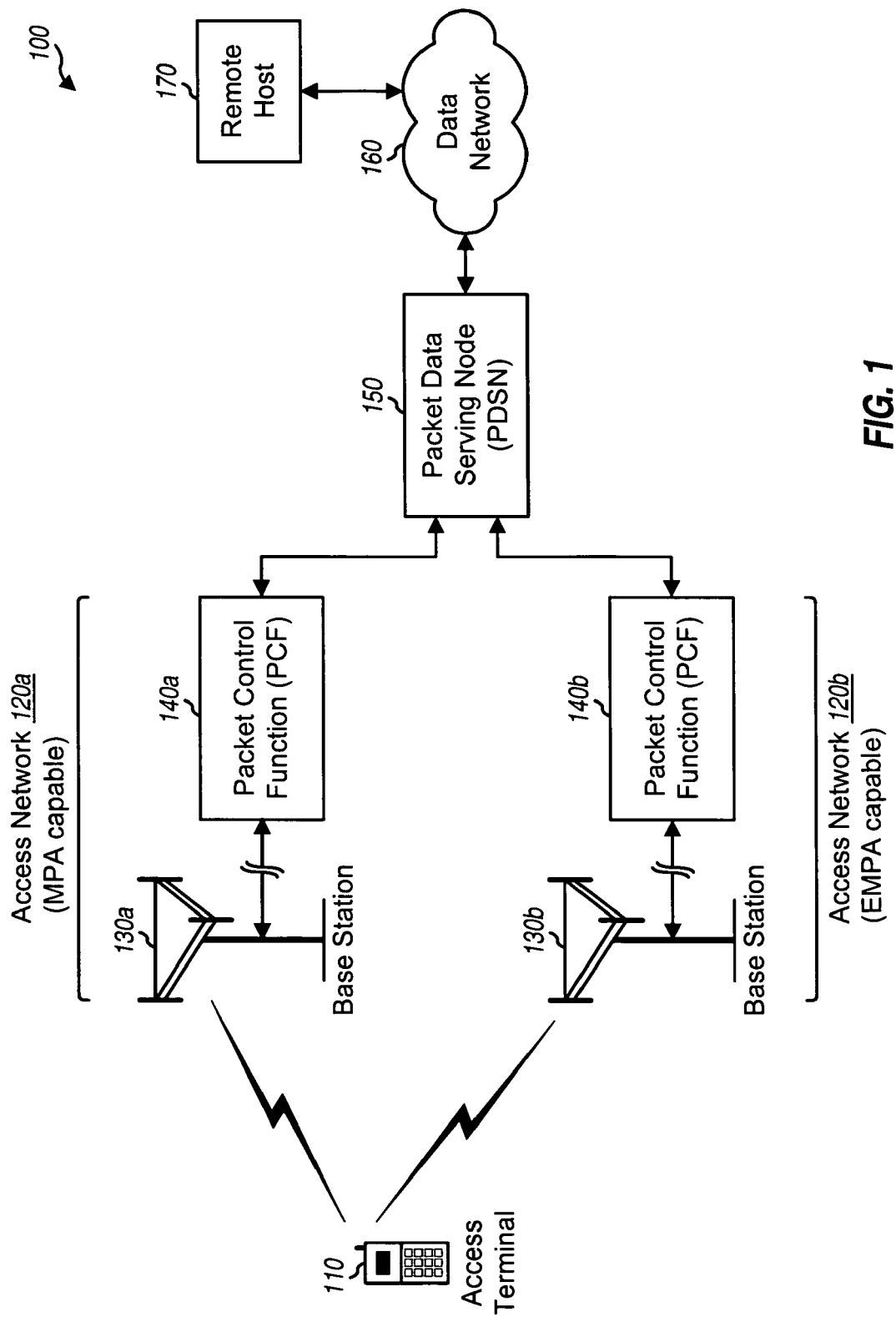
FIG. 1 shows an access terminal communicating with multiple access networks.

FIG. 1 shows a deployment 100 in which an access terminal (AT) 110 is capable of communicating with multiple access networks (ANs) 120a and 120b. Access terminal 110 may be a cellular phone, a personal digital assistant (PDA), a wireless device, a modem card, a handheld device, or some other wireless communication unit or device. Access terminal 110 may also be referred to as a mobile station (MS), a user equipment (UE), a user terminal, and so on. Access terminal 110 may also be able to communicate with other access networks such as a CDMA 1x network, a GSM network, a Universal Mobile Telecommunications System (UMTS) network that utilizes W-CDMA, an IEEE 802.11 network, and so on.

Each access network 120 may include various network entities described by 3GPP2, such as base stations and Packet Control Functions (PCFs). In general, each access network 120 may include any number of base stations 130 and any number of PCFs 140. For simplicity, only one base station 130 and one PCF 140 are shown for each access network 120 in FIG. 1. Access terminal 110 may communicate with a base station 130 in an access network 120 via an air-link connection. For packet data service, base station 130 communicates with PCF 140, which further communicates with a Packet Data Serving Node (PDSN) 150. PCF 140 controls the transmission of packets between base station 130 and PDSN 150.

PDSN 150 supports packet data service for access terminals in access networks 120a and 120b. For example, PDSN 150 may be responsible for the establishment, maintenance, and termination of Point-to-Point Protocol (PPP) sessions for the access terminals. PDSN 150 may also assign dynamic Internet Protocol (IP) addresses to the access terminals. PDSN 150 may couple to the Internet and/or other data networks (e.g., a data network 160) and may communicate with other entities (e.g., a remote host 170) that couple to these data networks.

Access network 120a implements 1xEV-DO and supports Multi-flow Packet Application (MPA), which is a set of protocols that allows for setup of multiple flows to carry data between an access terminal and an access network. MPA includes a Radio Link Protocol (RLP) that provides retransmission and duplicate detection, a Data Over Signaling Protocol that provides transmission and duplicate detection of higher layer data packets using signaling messages, a Location Update Protocol that defines location update procedures and messages in support of mobility management for MPA, and a Flow Control Protocol that provides flow control for MPA. 1xEV-DO and MPA are described in 3GPP2 C.S0024-A, entitled "cdma2000 High Rate Packet Data Air Interface Specification," Version 2.0, July 2005, which is publicly available.

Access network 120b implements 1xEV-DO and supports Enhanced MPA (EMPA), which is an enhanced set of protocols that allows for exchange of multiple flows to carry data between an access terminal and an access network. EMPA is described in 3GPP2 C.S0063-0, entitled "cdma2000® High Rate Packet Data Supplemental Services," January 2005, which is publicly available.

Figure 2C:
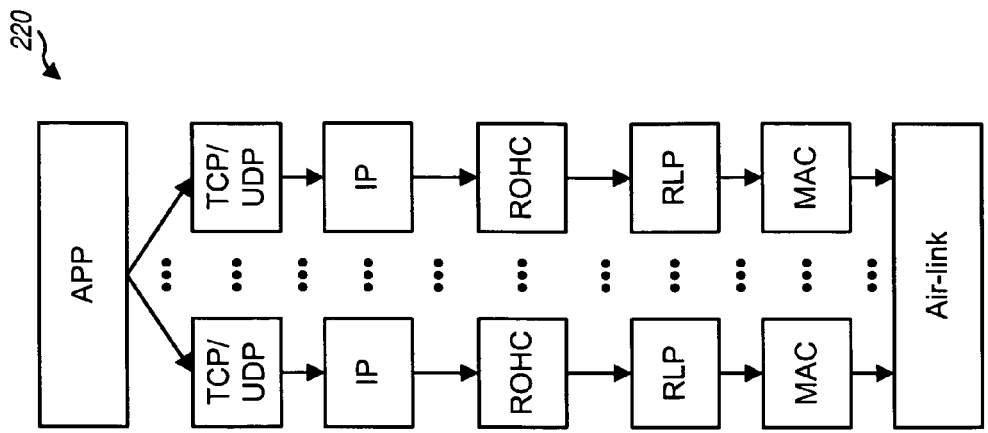
FIGS. 2A, 2B and 2C show exemplary protocol stacks.
Figure 2B:
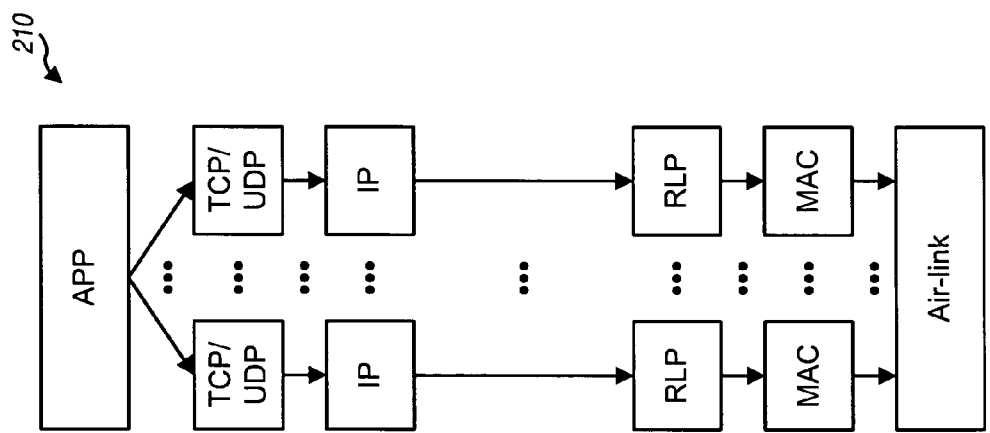
Figure 2A:
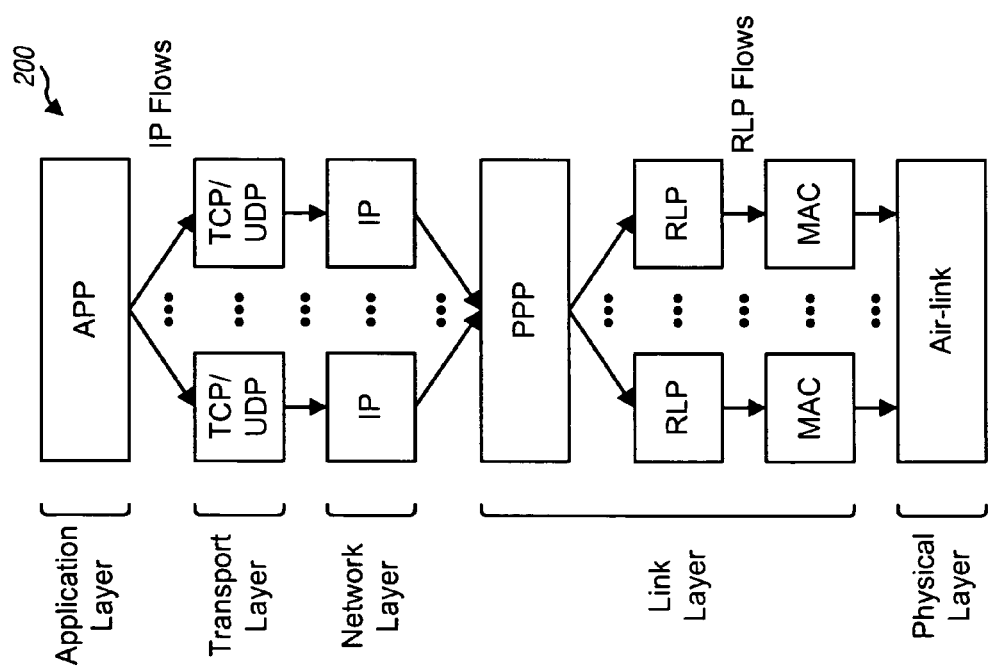

FIG. 2A shows an exemplary protocol stack 200 at access terminal 110. Protocol stack 200 is supported by both MPA and EMPA and includes an application layer, a transport layer, a network layer, a link layer, and a physical layer. Applications (APP) at access terminal 110 may exchange data with applications at remote host 170 using a data protocol stack composed of the transport layer and the network layer. The transport layer may utilize Transmission Control Protocol (TCP), User Datagram Protocol (UDP), and/or some other protocol. The network layer typically utilizes IP. Transport layer data (e.g., for TCP and/or UDP) is encapsulated in IP packets, which are exchanged between access terminal 110 and remote host 170 via access network 120a or 120b and PDSN 150. The link layer between access terminal 110 and access network 120a or 120b is implemented with PPP over RLP. Access terminal 110 maintains a PPP session with PDSN 150 for a data session and communicates with access network 120a or 120b via RLP for data exchanges. RLP operates on top of an air-link interface, e.g., 1xEV-DO.

FIG. 2A also shows data flow in the transmit direction. Any number of applications may be active, and each active application may exchange one or more IP flows in each direction. The IP flows may also be referred to as QoS flows, traffic flows, data flows, and so on. Each IP flow may carry a specific type of data, e.g., audio, video, or control. Data for the IP flows is encapsulated by TCP and/or UDP (either TCP or UDP for each IP flow), then encapsulated by IP and further multiplexed into one PPP flow to be sent to PDSN 150. The PPP flow may be demultiplexed into one or more RLP flows, which may be processed by RLP and Medium Access Control (MAC) and then sent to access network 120a or 120b. For protocol stack 200, one or more IP flows may be mapped to a single PPP flow, which may then be mapped to one or more RLP flows.

FIG. 2B shows another exemplary protocol stack 210 supported by EMPA. For protocol stack 210, applications at access terminal 110 may exchange data using a data protocol stack that may be implemented with TCP and/or UDP over IP. For protocol stack 210, IP operates directly over RLP, and PPP is removed. Each active application may send one or more IP flows. The data for the IP flows is encapsulated by TCP and/or UDP, then encapsulated by IP, and further mapped to one or more RLP flows. The RLP flows are processed by RLP and MAC and then sent to access network 120b. For protocol stack 210, any number of IP flows may be mapped to any number of RLP flows.

FIG. 2C shows yet another exemplary protocol stack 220 supported by EMPA. For protocol stack 220, applications at access terminal 110 may exchange data using a data protocol stack that may be implemented with TCP and/or UDP over IP. For protocol stack 220, IP operates over Robust Header Compression (ROHC) protocol, which in turn operates over RLP. Each active application may send one or more IP flows. The data for the IP flows is encapsulated by TCP and/or UDP, encapsulated by IP, processed by ROHC, and further mapped to one or more RLP flows. The RLP flows are processed by RLP and MAC and then sent to access network 120b. For protocol stack 220, any number of IP flows may be mapped to any number of RLP flows.

Access terminal 110 may exchange one or more IP flows via access network 120a or 120b at any given moment. The QoS for each IP flow may be defined using QoS parameters supported by the access network. Different levels of QoS may be specified for different IP flows to achieve the desired performance.

Each IP flow may also be defined by (and associated with) one or more packet filters. Each packet filter may be formed by one or more filter parameters/components for one or more fields of an IP header and/or one or more fields of a higher layer header (e.g., a TCP or UDP header). A data packet matches a packet filter if the applicable fields of that data packet conform to the filter parameters of that packet filter. In the transmit direction, outbound data packets from higher layer applications may be filtered with one set of packet filters to segregate these data packets into appropriate IP flows, which may thereafter be sent at the specified QoS to a serving access network. In the receive direction, inbound data packets from the serving access network may be filtered with another set of packet filters to segregate the inbound data packets into appropriate IP flows, which may thereafter be routed to the proper destination at access terminal 110. Access terminal 110 may form a traffic filter template (TFT) that includes packet filters to be used by PDSN 150 for IP flows for access terminal 110. The TFT may be sent to and installed at PDSN 150 to filter traffic data for access terminal 110.

Figure 3:
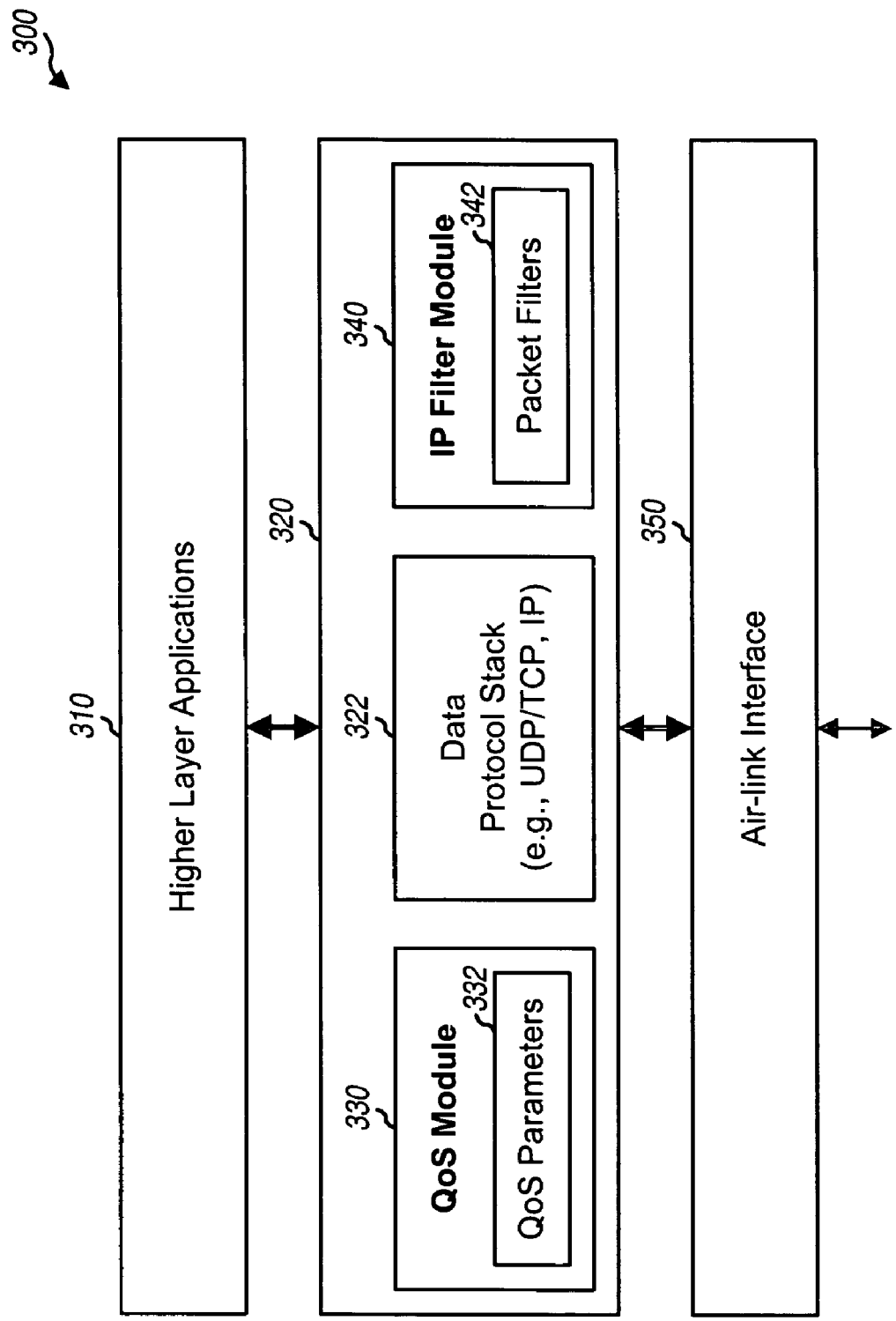
FIG. 3 shows a data processing module at the access terminal.

FIG. 3 shows an embodiment of access terminal 110. Higher layer applications 310 execute over a data processing module 320, which may be implemented with software, firmware, hardware, or a combination thereof. For example, module 320 may be part of system software for access terminal 110. In the embodiment shown in FIG. 3, module 320 includes a data protocol stack 322, a QoS module 330, and an IP filter module 340. Data protocol stack 322 may implement any combination of protocols for any number of layers, e.g., UDP and/or TCP over IP.

QoS module 330 performs various functions to support QoS. QoS module 330 may provide an interface via which higher layer applications 310 can specify QoS for IP flows using pertinent QoS parameters. QoS module 330 may perform conversion between the QoS parameters specified by applications 310 and QoS parameters supported by the access networks. QoS module 330 may also negotiate QoS with the access networks.

IP filter module 340 performs various functions to support packet filtering. IP filter module 340 may specify packet filters to be applied at access terminal 110 such that (1) IP flows are mapped to the proper RLP flows in the transmit direction and (2) RLP flows are mapped to the proper IP flows in the receive direction. IP filter module 340 may also specify packet filters to be applied at PDSN 150 on outbound packets to be sent to access terminal 110 and inbound packets received from access terminal 110. IP filter module 340 may generate, modify, and send a TFT via access network 120a or 120b to PDSN 150. The TFT contains packet filters to be applied at PDSN 150.

Figure 4:
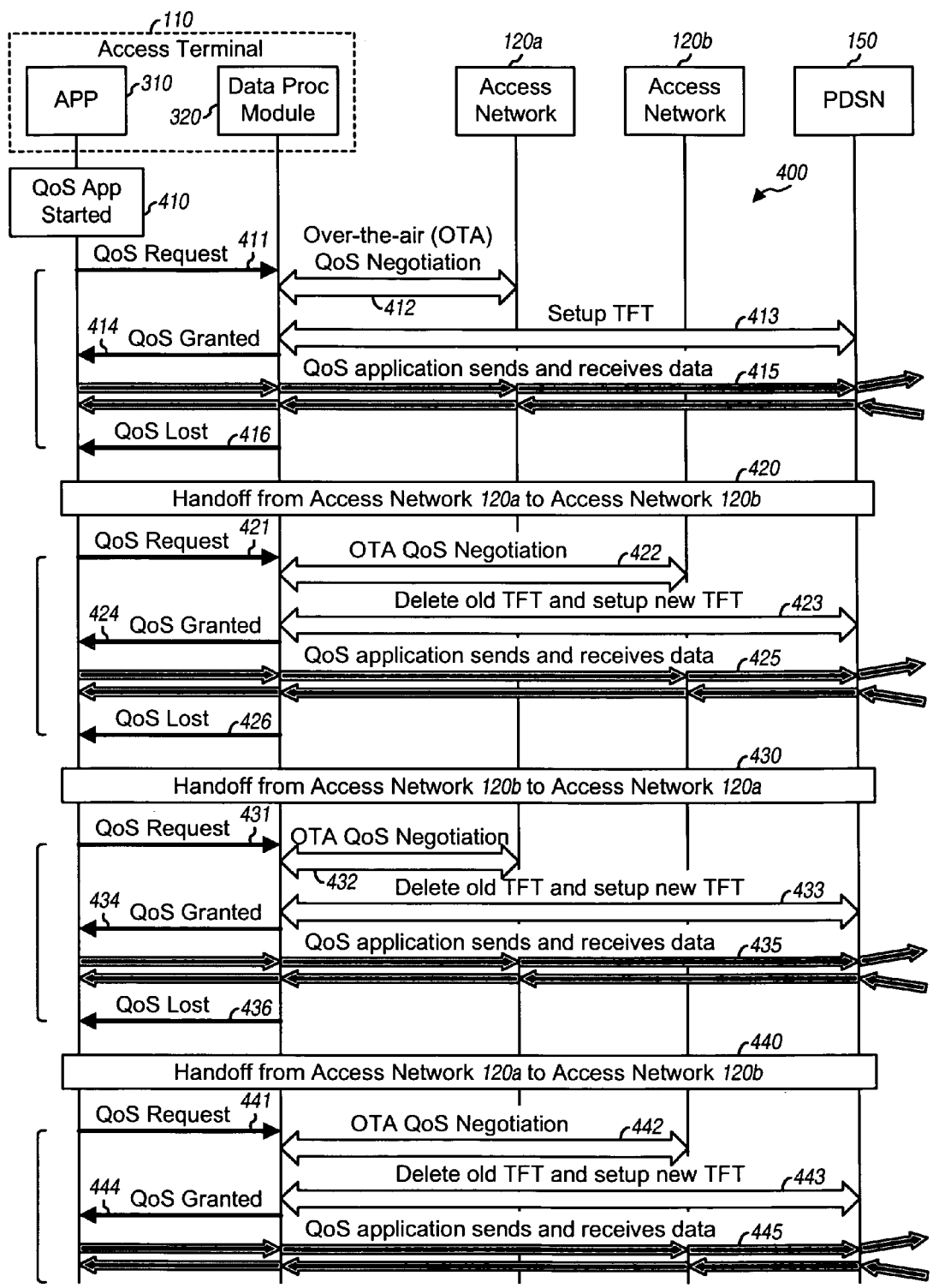
FIG. 4 shows a call flow for a scenario in which the access terminal is repeatedly handed off between two access networks.

FIG. 4 shows an exemplary call flow 400 for a scenario in which access terminal 110 is repeatedly handed off between access networks 120a and 120b. In the example shown in FIG. 4, access network 120a is the initial serving access network for access terminal 110. For simplicity, the signaling between access terminal 110 and access network 120a for session negotiation and terminal authentication as well as the signaling between access terminal 110 and PDSN 150 for PPP negotiation and user authentication are not shown in FIG. 4.

At access terminal 110, higher layer applications (APP) 310 may start a QoS application, which is an application having QoS requirements (step 410). The QoS application may be for voice, video, packet data, messaging, and so on and may utilize one or more IP flows for each of the forward and reverse links. Applications 310 send to data processing module 320 a QoS request with pertinent QoS parameters for the IP flows (step 411). Module 320 performs over-the-air (OTA) negotiation with access network 120a for the desired QoS (step 412). The QoS negotiation allows access network 120a to allocate and grant resources, if available, to access terminal 110 to achieve the desired QoS. In general, QoS may be negotiated for each IP flow. Module 320 also determines packet filters to be applied at access terminal 110 as well as packet filters to be applied at PDSN 150 for the QoS application. Module 320 then exchanges signaling with PDSN 150 to set up a TFT at PDSN 150 for the QoS application (step 413). After setting up the TFT, module 320 provides to applications 310 an indication that QoS has been granted (step 414). Thereafter, the QoS application may send and receive data over the established IP flows at the desired QoS levels via access network 120a and PDSN 150 (step 415).

Access terminal 110 may be roaming and/or may be located between the coverage areas of access networks 120a and 120b. Access terminal 110 may move out of the coverage of access network 120a and into the coverage of access network 120b. Upon detecting loss of coverage with access network 120a, module 320 may provide to applications 310 an indication of the established IP flows and QoS for access network 120a being lost (step 416). Access terminal 110 may then perform a handoff procedure to be handed off from access network 120a to access network 120b (step 420).

Upon receiving the lost of QoS indication from module 320, applications 310 may again send a QoS request with pertinent QoS parameters for the QoS application (step 421). Module 320 may then perform over-the-air negotiation with access network 120b for the desired QoS (step 422), determine packet filters for the QoS application, and exchange signaling via access network 120b to delete the old TFT and set up a new TFT at PDSN 150 for the QoS application (step 423). Module 320 may then provide to applications 310 an indication that QoS has been granted (step 424). Thereafter, the QoS application may send and receive data over the established IP flows at the desired QoS levels via access network 120b and PDSN 150 (step 425).

Access terminal 110 may thereafter move back into the coverage of access network 120a. Upon detecting loss of coverage with access network 120b, module 320 may provide to applications 310 an indication of the established IP flows and QoS for access network 120b being lost (step 426). Access terminal 110 may then perform a handoff procedure to be handed off from access network 120b to access network 120a (step 430). Applications 310 may again send a QoS request with pertinent QoS parameters for the QoS application (step 431). Module 320 may then perform over-the-air negotiation with access network 120a for the desired QoS (step 432), determine packet filters for the QoS application, and exchange signaling via access network 120a to delete the old TFT and set up a new TFT at PDSN 150 for the QoS application (step 433). Module 320 may then provide to applications 310 an indication that QoS has been granted (step 434). Thereafter, the QoS application may send and receive data via access network 120a and PDSN 150 (step 435).

Access terminal 110 may thereafter move back into the coverage of access network 120b. Access terminal 110 may then perform steps 436 through 445 in the same manner as steps 416 through 425, respectively, to establish QoS with access network 120b and to set up a new TFT with PDSN 150 so that data may be exchanged between access terminal 110 and PDSN 150 via access network 120b.

As shown in FIG. 4, access terminal 110 may exchange signaling with an access network 120 to negotiate QoS and may also exchange signaling with PDSN 150 to set up a TFT whenever access terminal 110 is handed off to the access network. The signaling exchanges may be needed since 1xEV-DO standard does not support seamless handoff between MPA and EMPA. The signaling exchanges are undesirable for several reasons. First, valuable radio resources are consumed to exchange the signaling over the air. Second, the QoS application may need to specify QoS each time a handoff is made to a new serving access network.

In an aspect, seamless handoff between access networks is achieved by (1) saving session information/configuration for each access network upon being handed off from the access network and (2) invoking the saved session information/configuration upon being handed back to the access network.

Figure 5:
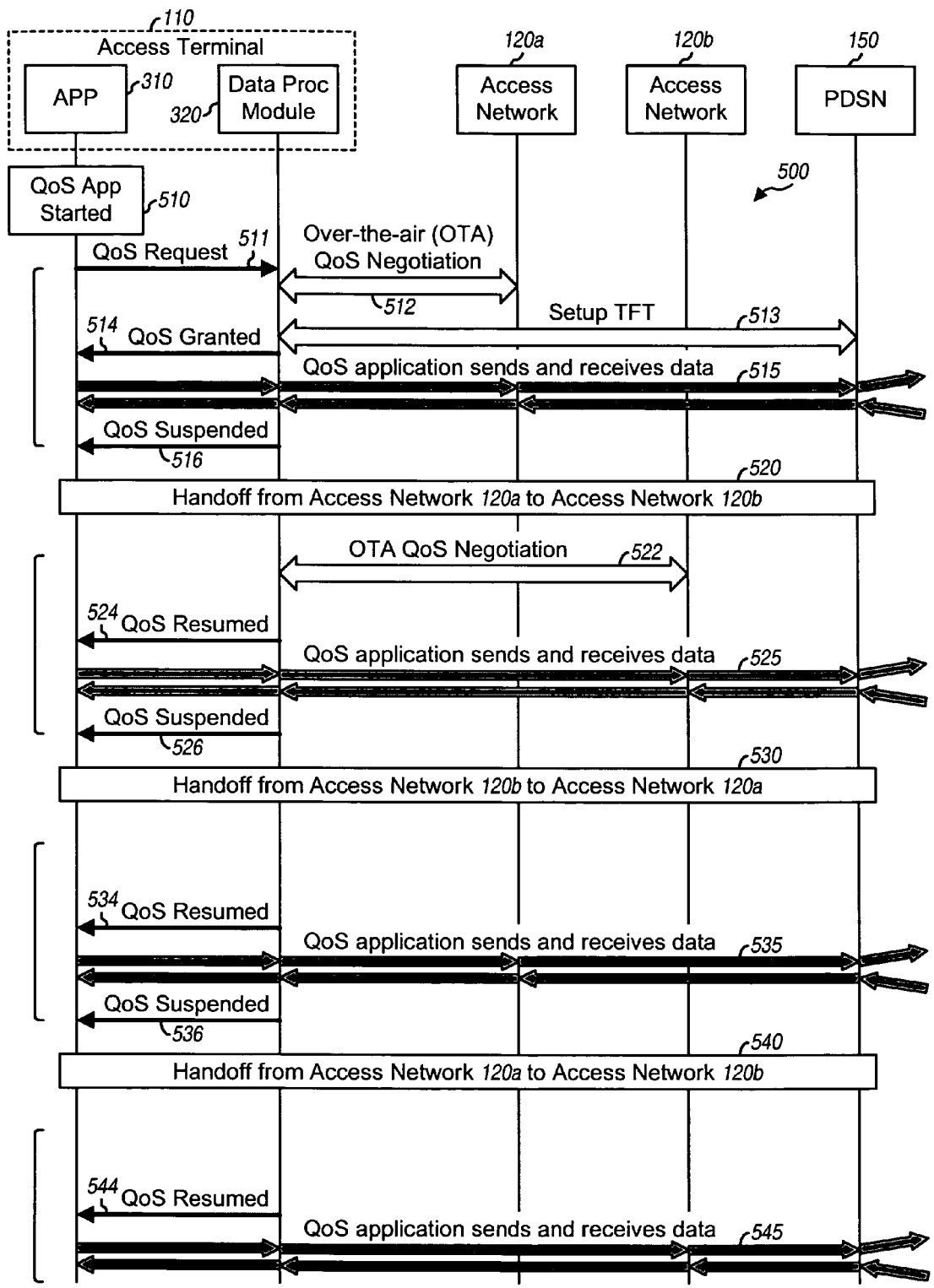
FIG. 5 shows a call flow with less signaling using saved session configurations.

FIG. 5 shows an exemplary call flow 500 for a scenario in which access terminal 110 is repeatedly handed off between access networks 120a and 120b. For call flow 500, higher layer applications 310 may start a QoS application (step 510). Applications 310 may send a QoS request with pertinent QoS parameters for IP flows (step 511). Module 320 may then perform over-the-air negotiation with access network 120a for the desired QoS (step 512), determine packet filters for the QoS application, and exchange signaling via access network 120a to set up a TFT at PDSN 150 for the QoS application (step 513). Module 320 may then provide an indication that QoS has been granted (step 514). Thereafter, the QoS application may send and receive data via access network 120a and PDSN 150 (step 515).

In an embodiment, access terminal 110 (e.g., module 320) stores session information/configuration for access network 120a. The session information may comprise the QoS parameters negotiated with access network 120a, reservation labels used for IP flows exchanged with access network 120a, binding of IP flows to RLP flows, binding of Reverse Traffic Channel-Medium Access Control (RTC-MAC) to RLP, and/or other binding for access network 120a, other state information, and so on. Reservation labels are identifiers for IP flows. In an embodiment, access network 120a also stores session information for access terminal 110. The session information stored by access network 120a may include QoS information, binding information, and/or other state information. The session information stored by access network 120a may be the same as or different from the session information stored by access terminal 110. The session information stored at both entities 110 and 120a may be used later to facilitate seamless handoff.

Access terminal 110 may move out of the coverage of access network 120a and into the coverage of access network 120b. Upon detecting loss of coverage with access network 120a, module 320 may provide to applications 310 an indication of the established IP flows and QoS being suspended (step 516). Applications 310 receive the indication and do not need to take any action.

Access terminal 110 may then perform a handoff procedure to be handed off from access network 120a to access network 120b (step 520). Module 320 may then perform over-the-air negotiation with access network 120b for the desired QoS (step 522). Since the desired QoS is stored by module 320, the QoS application does not need to send another QoS request. In an embodiment, the reservation labels used for IP flows exchanged with access network 120a are also used for IP flows to be exchanged with access network 120b. In an embodiment, the binding of IP flows to RLP flows, the binding of RTC-MAC to RLP, and/or other binding previously used for access network 120a are also used for access network 120b. The use of the same reservation labels and the same binding for both access networks 120a and 120b allows PDSN 150 to use the same TFT to filter traffic data to be forwarded via access networks 120a and 120b. In this case, module 320 does not need to exchange signaling with PDSN 150 to set up a new TFT, as shown in FIG. 5.

In an embodiment, access network 120b stores session information for access terminal 110. The session information stored by access network 120b may include QoS information, binding information, and/or other state information. The session information stored by access network 120b may be the same as or different from the session information stored by access terminal 110. In any case, the session information stored at both entities 110 and 120b may be used later to facilitate seamless handoff.

After completing QoS negotiation with access network 120b, module 320 provides to applications 310 an indication that QoS has resumed (step 524). Thereafter, the QoS application may send and receive data on the established IP flows at the desired QoS levels via access network 120b and PDSN 150 (step 525).

Access terminal 110 may thereafter move back into the coverage of access network 120a. Upon detecting loss of coverage with access network 120b, module 320 may provide to applications 310 an indication of QoS being suspended (step 526). Access terminal 110 may then perform a handoff procedure to be handed off from access network 120b to access network 120a (step 530). Access network 120a may retrieve and use the session information previously stored by access network 120a for access terminal 110. In this case, the negotiation for QoS may be avoided. After handoff is completed, module 320 may provide to applications 310 an indication that QoS has resumed (step 534). Thereafter, the QoS application may send and receive data via access network 120a and PDSN 150 (step 535).

Access terminal 110 may thereafter move back into the coverage of access network 120b. Upon detecting loss of coverage with access network 120a, module 320 may provide to applications 310 an indication of QoS being suspended (step 536). Access terminal 110 may then perform handoff from access network 120a to access network 120b, which may retrieve and use the session information previously stored for access terminal 110 (step 540). In this case, the negotiation for QoS may be avoided, and module 320 may quickly provide an indication that QoS has resumed (step 544). The QoS application may then send and receive data via access network 120b and PDSN 150 (step 545).

In the embodiment shown in FIG. 5, access terminal 110 may negotiate QoS with a given access network 120 the first time that the access terminal communicates with the access network. Access terminal 110 and access network 120 may each store session information/configuration for the access terminal. Thereafter, if access terminal 110 is handed back to access network 120, the stored session information may be retrieved, and QoS negotiation may be avoided. Furthermore, access terminal 110 may use the same reservation labels and binding for all access networks served by the same PDSN 150, so that the same TFT may be used for these access networks. Hence, TFT setup may also be avoided whenever access terminal 110 is handed off to another access network served by the same PDSN 150.

Comparing call flow 400 in FIG. 4 to call flow 500 in FIG. 5, steps 421, 431 and 441 for QoS request, steps 432 and 442 for QoS negotiation, and steps 423, 433 and 443 for TFT setup have been eliminated from call flow 500. Steps 432 and 442 for QoS negotiation and steps 423, 433 and 443 for TFT setup may be considered as major steps. Each major step is composed of a number of smaller steps that may involve exchange of several signaling messages between access terminal 110 and access network 120. For example, each QoS negotiation step may involve exchanges of 7 or 8 signaling messages between access terminal 110 and access network 120 to negotiate QoS.

The embodiment shown in FIG. 5 may substantially reduce over-the-air signaling when access terminal 110 is repeatedly handed off between access networks, since there is no need to re-negotiate QoS or to set up TFT over again. Furthermore, module 320 may handle QoS negotiation for a new access network without involving the QoS application. Since module 320 stores the session information, the QoS application does not need to send a new QoS request for each handoff. The QoS application may only notice temporary suspension of QoS while handoff is in progress and may be able to resume exchanging data earlier upon receiving a QoS resumed indication from module 320 after completion of handoff.

Figure 6:
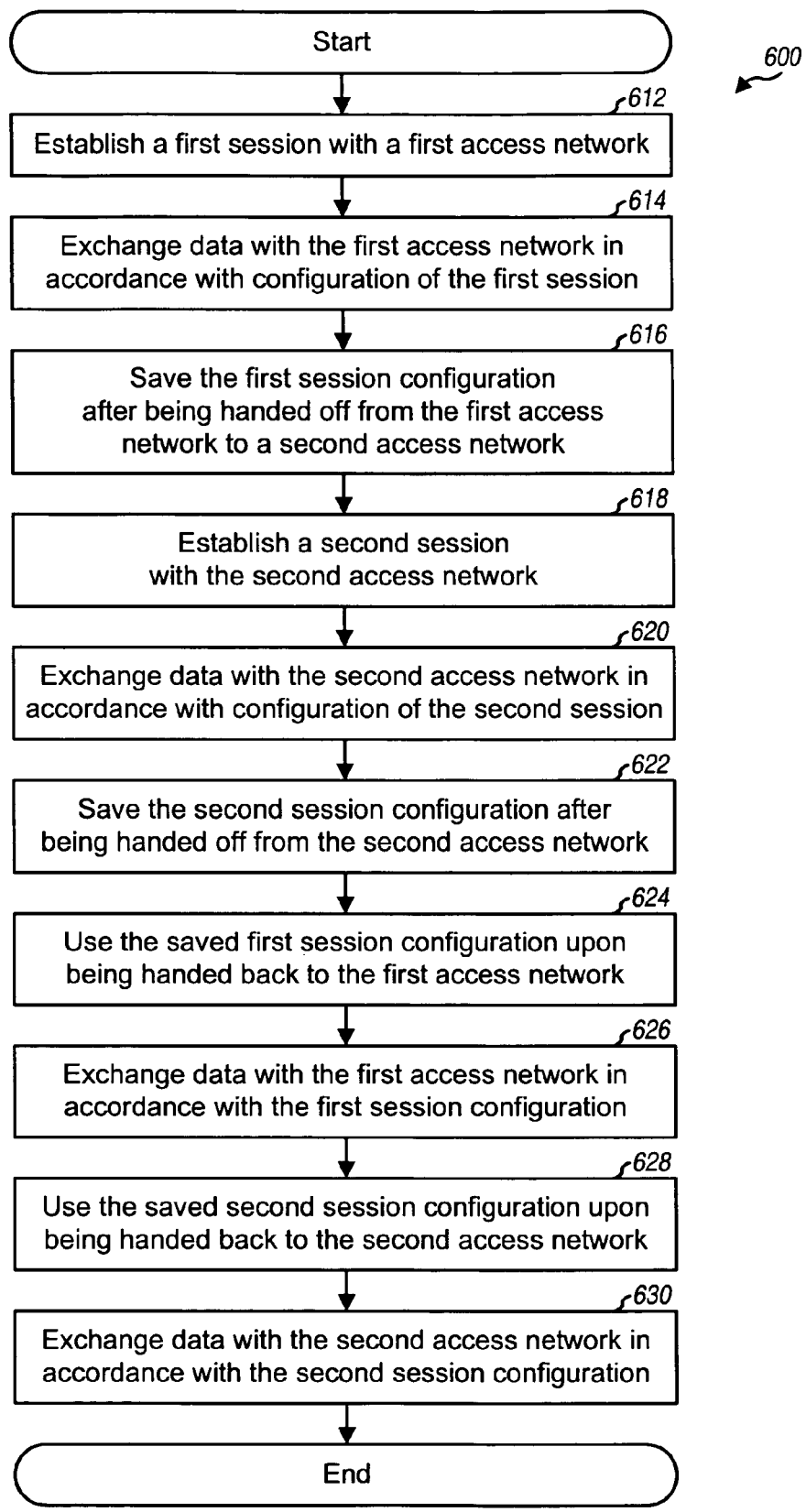
FIG. 6 shows a process performed by the access terminal.

FIG. 6 shows an embodiment of a process 600 performed by access terminal 110 for a session with multiple access networks. Access terminal 110 establishes a first session with a first access network, which may be MPA capable access network 120a, EMPA capable access network 120b, or some other access network (block 612). The session establishment may entail performing QoS negotiation with the first access network, setting up packet filters (e.g., a TFT) at a packet data gateway (e.g., PDSN 150) for the first access network, and so on. The configuration of the first session may comprise the QoS negotiated with the first access network, flow information used to create the packet filters, and so on. Access terminal 110 thereafter exchanges data with the first access network in accordance with the configuration of the first session (block 614).

Access terminal 110 saves the first session configuration after being handed off from the first access network to a second access network, which may be EMPA capable access network 120b, MPA capable access network 120a, or some other access network (block 616). Access terminal 110 establishes a second session with the second access network (block 618). The session establishment may entail performing QoS negotiation with the second access network using the same reservation labels and binding such that the packet filters already set up at the packet data gateway may still be used. Access terminal 110 then exchanges data with the second access network in accordance with the configuration of the second session (block 620).

Access terminal 110 saves the second session configuration after being handed off from the second access network to the first access network (block 622). Access terminal 110 uses the saved first session configuration upon being handed back to the first access network (block 624). Depending on the network design and operation, access terminal 110 may reinstate/restart the first session that was established earlier with the first access network or may start a new session with the first access network. In any case, the use of the saved first session configuration allows access terminal 110 to avoid performing QoS negotiation again with the first access network and setting up new packet filters at the packet data gateway. Access terminal 110 then exchanges data with the first access network in accordance with the first session configuration (block 626).

Access terminal 110 uses the saved second session configuration upon being handed back to the second access network (block 628). This allows access terminal 110 to avoid performing QoS negotiation again with the second access network and setting up new packet filters at the packet data gateway. Access terminal 110 then exchanges data with the second access network in accordance with the second session configuration (block 630).

Figure 7:
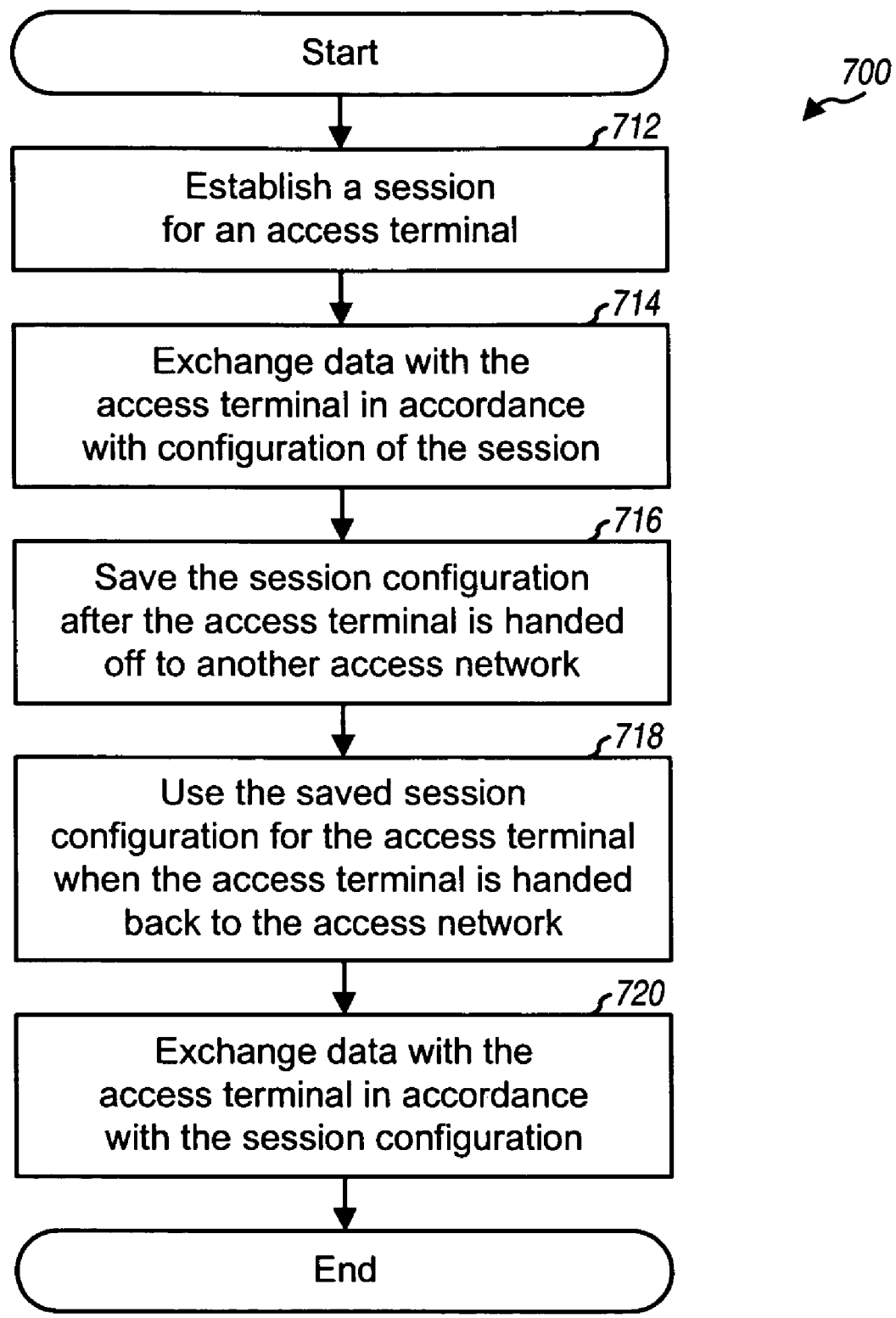
FIG. 7 shows a process performed by an access network.

FIG. 7 shows an embodiment of a process 700 performed by an access network 120x for a session with access terminal 110. Access network 120x may be MPA capable access network 120a, EMPA capable access network 120b, or some other access network.

Access network 120x establishes a session for access terminal 110 (block 712). This may entail performing QoS negotiation with access terminal 110 and exchanging signaling with access terminal 110 to send packet filters (e.g., a TFT) to a packet data gateway (e.g., PDSN 150). The configuration of the session may comprise the negotiated QoS, flow information, and so on. Access network 120x exchanges data with access terminal 110 in accordance with the configuration of the session (block 714). Access network 120x saves the session configuration after access terminal 110 is handed off to another access network (block 716). Access network 120x uses the saved session configuration for access terminal 110 when access terminal 110 is handed back to access network 120x (block 718). This allows access network 120x to skip QoS negotiation with access terminal 110 and to skip signaling exchanges to set up new packet filters at the packet data gateway when access terminal 110 is handed back to access network 120x. Access network 120x exchanges data with access terminal 110 in accordance with the session configuration (block 720).

Figure 8:
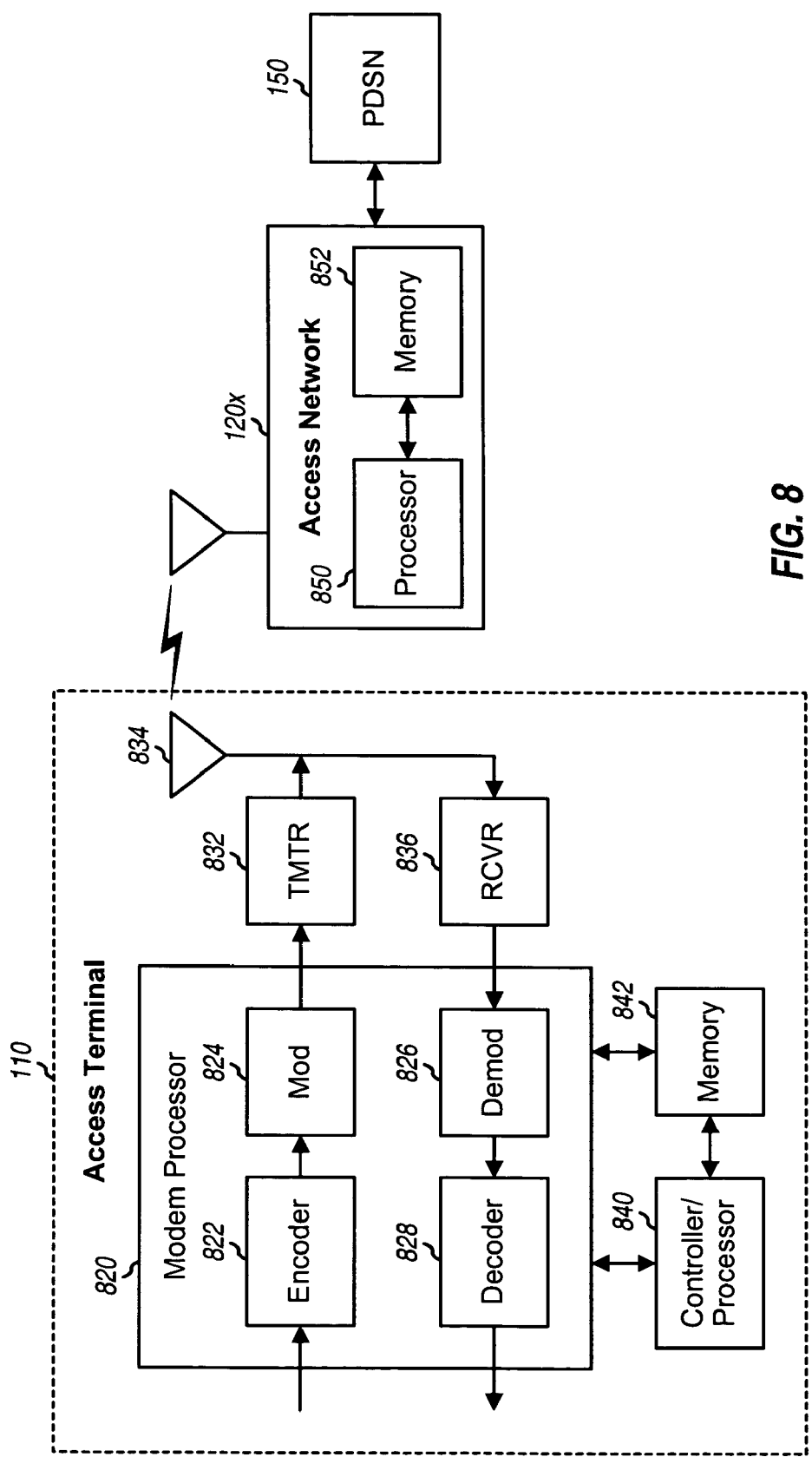
FIG. 8 shows a block diagram of the access terminal.

FIG. 8 shows a block diagram of an embodiment of access terminal 110. In the transmit direction, data and signaling to be sent by access terminal 110 are processed (e.g., formatted, encoded, and interleaved) by an encoder 822 and further processed (e.g., modulated, channelized, and scrambled) by a modulator (Mod) 824 to generate output chips. A transmitter (TMTR) 832 then conditions (e.g., converts to analog, filters, amplifies, and frequency upconverts) the output chips and generates a reverse link signal, which is transmitted via an antenna 834. In the receive direction, forward link signals transmitted by base stations in access networks are received by antenna 834. A receiver (RCVR) 836 conditions (e.g., filters, amplifies, frequency downconverts, and digitizes) the received signal from antenna 834 and provides samples. A demodulator (Demod) 826 processes (e.g., descrambles, channelizes, and demodulates) the samples and provides symbol estimates. A decoder 828 further processes (e.g., deinterleaves and decodes) the symbol estimates and provides decoded data. Encoder 822, modulator 824, demodulator 826, and decoder 828 may be implemented by a modem processor 820. These units perform processing in accordance with the radio technology (e.g., 1xEV-DO, CDMA2000, W-CDMA, or GSM) used by the serving access network.

A controller/processor 840 directs the operation of various units at access terminal 110. Controller/processor 840 may implement protocol stack 300 in FIG. 3, process 600 in FIG. 6, and/or other processes to support communication services. A memory 842 stores program codes and data for access terminal 110. Memory 842 may store session information/configuration (e.g., QoS parameters, flow information, packet filters, and so on) for each access network of interest.

FIG. 8 also shows a simple embodiment of access network 120x, which includes a processor 850 and a memory 852. Processor 850 performs various functions for communication with access terminals and may implement 700 in FIG. 7 and/or other processes to support communication with the access terminals. Processor 850 may be a single processor or a collection of processors. Memory 852 stores program codes and data for access network 120x. Memory 852 may also store session information/configuration for access terminal 110 as well as other access terminals that communicate with access network 120x.

The techniques described herein may be implemented by various means. For example, these techniques may be implemented in hardware, firmware, software, or a combination thereof. For a hardware implementation, the processing units at an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at an access network or a network entity may also be implemented within one or more ASICs, DSPs, processors, and so on.

For a firmware and/or software implementation, the techniques may be implemented with modules (e.g., procedures, functions, and so on) that perform the functions described herein. The firmware and/or software codes may be stored in a memory (e.g., memory 842 or 852 in FIG. 8) and executed by a processor (e.g., processor 840 or 850). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to establish a first session with a first access network, to exchange data with the first access network in accordance with configuration of the first session, to save the first session configuration after being handed off from the first access network to a second access network, and to use the saved first session configuration upon being handed back to the first access network; and
a memory coupled to the at least one processor, wherein the at least one processor is configured to establish a second session with the second access network upon being handed off from the first access network to the second access network, to exchange data with the second access network in accordance with configuration of the second session, and to save the second session configuration after being handed off from the second access network, and wherein the at least one processor is configured to use the saved second session configuration upon being handed back to the second access network.

2. The apparatus of claim 1, wherein the at least one processor is configured to negotiate quality of service (QoS) with the first access network, and wherein the first session configuration comprises the QoS negotiated with the first access network.

3. The apparatus of claim 2, wherein the at least one processor is configured to skip QoS negotiation with the first access network upon being handed back to the first access network.

4. The apparatus of claim 1, wherein the at least one processor is configured to receive a single request for quality of service (QoS) from an application and to establish both the first session with the first access network and the second session with the second access network in accordance with the single request for QoS from the application.

5. The apparatus of claim 1, wherein the at least one processor is configured to receive a request for quality of service (QoS) from an application, to negotiate QoS with the first access network in accordance with the request for QoS, and to negotiate QoS with the second access network in accordance with the request for QoS upon being handed off from the first access network to the second access network, wherein the first session configuration comprises the QoS negotiated with the first access network, and wherein the second session configuration comprises the QoS negotiated with the second access network.

6. The apparatus of claim 5, wherein the at least one processor is configured to provide an indication of QoS being suspended upon being handed off from the first access network to the second access network, and to provide an indication of QoS being resumed after completing QoS negotiation with the second access network.

7. The apparatus of claim 1, wherein the at least one processor is configured to create a traffic filter template (TFT) for at least one flow exchanged with the first access network, and wherein the first session configuration comprises information used to create the TFT.

8. The apparatus of claim 7, wherein the at least one processor is configured to exchange signaling with the first access network to send the TFT to a packet data serving node.

9. The apparatus of claim 7, wherein the at least one processor is configured to skip TFT creation upon being handed back to the first access network.

10. The apparatus of claim 1, wherein the first access network supports Multi-flow Packet Application (MPA) in CDMA2000 1xEV-DO, and wherein the second access network supports Enhanced Multi-flow Packet Application (EMPA) in CDMA2000 1xEV-DO.

11. The apparatus of claim 1, wherein the second access network supports Multi-flow Packet Application (MPA) in CDMA2000 1xEV-DO, and wherein the first access network supports Enhanced Multi-flow Packet Application (EMPA) in CDMA2000 1xEV-DO.

12. The apparatus of claim 1, wherein the memory stores the first session configuration.

13. The apparatus of claim 1, wherein the first session configuration includes a Quality of Service (QoS) parameter negotiated with the first access network.

14. The apparatus of claim 1, wherein the first session configuration includes a reservation label for an Internet Protocol (IP) flow.

15. The apparatus of claim 1, wherein the first session configuration includes binding information.

16. A method comprising:
establishing a first session with a first access network;
exchanging data with the first access network in accordance with configuration of the first session;
saving the first session configuration after being handed off from the first access network to a second access network;
using the saved first session configuration upon being handed back to the first access network;
establishing a second session with the second access network upon being handed off from the first access network to the second access network;
exchanging data with the second access network in accordance with configuration of the second session
saving the second session configuration after being handed off from the second access network; and
using the saved second session configuration upon being handed back to the second access network.

17. The method of claim 16, wherein the establishing the first session comprises negotiating quality of service (QoS) with the first access network, and wherein the first session configuration comprises the QoS negotiated with the first access network.

18. The method of claim 16, wherein the establishing the first session comprises
creating a traffic filter template (TFT) for at least one flow exchanged with the first access network, and wherein the first session configuration comprises information used to create the TFT.

19. A non-transitory processor readable media for storing instructions operable in a wireless device to:
establish a first session with a first access network;
direct exchange of data with the first access network in accordance with configuration of the first session;
save the first session configuration after being handed off from the first access network to a second access network;
use the saved first session configuration upon being handed back to the first access network;
establish a second session with the second access network upon being handed off from the first access network to the second access network;
direct exchange of data with the second access network in accordance with configuration of the second session
save the second session configuration after being handed off from the second access network; and
use the saved second session configuration upon being handed back to the second access network.

20. The non-transitory processor readable media of claim 19, and further for storing instructions operable to:
negotiate quality of service (QoS) with the first access network, and wherein the first session configuration comprises the QoS negotiated with the first access network.

21. The non-transitory processor readable media of claim 19, and further for storing instructions operable to:
create a traffic filter template (TFT) for at least one flow exchanged with the first access network, and wherein the first session configuration comprises information used to create the TFT.

22. An access terminal comprising:
an antenna; and
means for (a) establishing a first session with a first access network, (b) exchanging data via the antenna with the first access network in accordance with configuration of the first session, (c) saving the first session configuration after being handed off from the first access network to a second access network, (d) using the saved first session configuration upon being handed back to the first access network, (e) establishing a second session with the second access network upon being handed off from the first access network to the second access network, (f) exchanging data via the antenna with the second access network in accordance with configuration of the second session, (g) saving the second session configuration after being handed off from the second access network, and (h) using the saved second session configuration upon being handed back to the second access network.

23. The access terminal of claim 22, further comprising:
a modem processor, wherein the modem processor is operatively coupled to the means, and wherein the modem processor is operatively coupled to the antenna.

24. The access terminal of claim 22, wherein the means comprises a processor and a memory.

* * * * *